United States Patent
Bajpay et al.

(10) Patent No.: US 8,855,003 B2
(45) Date of Patent: *Oct. 7, 2014

(54) METHOD AND APPARATUS FOR PROVIDING END TO END VIRTUAL PRIVATE NETWORK PERFORMANCE MANAGEMENT

(75) Inventors: Paritosh Bajpay, Edison, NJ (US); Shiu Chong, Fair Haven, NJ (US); Olivier Daude, Nice (FR); David Lu, Morganville, NJ (US); John Mayr, Raleigh, NC (US); Anand Singh, Marlboro, NJ (US); Sarma Tanuku, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/615,456

(22) Filed: Sep. 13, 2012

(65) Prior Publication Data

US 2013/0003593 A1 Jan. 3, 2013

Related U.S. Application Data

(63) Continuation of application No. 12/269,500, filed on Nov. 12, 2008, now Pat. No. 8,284,685.

(51) Int. Cl.
*G01R 31/08* (2006.01)
*H04L 12/24* (2006.01)
*H04L 12/26* (2006.01)

(52) U.S. Cl.
CPC ........ *H04L 41/5009* (2013.01); *H04L 43/0817* (2013.01); *H04L 43/065* (2013.01); *H04L 41/5032* (2013.01); *H04L 43/16* (2013.01); *H04L 41/507* (2013.01)
USPC ........................................................ 370/252

(58) Field of Classification Search
None
See application file for complete search history.

(56) References Cited

U.S. PATENT DOCUMENTS

| | | |
|---|---|---|
| 6,272,110 B1 | 8/2001 | Tunnicliffe et al. |
| 8,284,685 B2 | 10/2012 | Bajpay et al. |
| 2005/0216729 A1 | 9/2005 | Joels et al. |
| 2006/0002409 A1 | 1/2006 | Menon et al. |
| 2007/0177523 A1 | 8/2007 | Nagami et al. |
| 2010/0265826 A1 | 10/2010 | Khasnabish et al. |

*Primary Examiner* — Kwang B Yao
*Assistant Examiner* — Tung Q Tran (57) ABSTRACT

A method and apparatus for managing a virtual private network are disclosed. For example, the method collects performance data for at least one parameter from a plurality of customer edge routers and a plurality of provider edge routers associated with the virtual private network. The method correlates the performance data for identifying one or more performance exceptions based on a threshold for each of the at least one parameter, and performs a trending analysis using the one or more performance exceptions to predict a potential problem that will impact the virtual private network.

20 Claims, 6 Drawing Sheets

METHOD AND APPARATUS FOR PROVIDING END TO END VIRTUAL PRIVATE NETWORK PERFORMANCE MANAGEMENT

This application is a continuation of U.S. patent application Ser. No. 12/269,500, filed Nov. 12, 2008, which is currently allowed and is herein incorporated by reference in its entirety.

The present invention relates generally to communication networks and, more particularly, to a method and apparatus for providing end to end performance management in communication networks, e.g., packet networks such as Virtual Private Networks (VPN).

BACKGROUND OF THE INVENTION

Global enterprise networks tend to be large and expansive in scope, dispersed geographically across the globe and are designed to support a variety of services, such as voice, video, and data services. Each service has its own Quality of Service (QoS) and performance specifications, such as data delivery, latency and jitter requirements, which are generally guaranteed by Service Level Agreements (SLAs). Service providers who provide such networks for global enterprises have a challenging task to proactively manage these networks so that the SLAs will not be violated and negatively impact customer satisfaction, which may require financial payouts for failing to meet the requirements of the SLAs.

SUMMARY OF THE INVENTION

In one embodiment, the present invention discloses a method and apparatus for managing a virtual private network. For example, the method collects performance data for at least one parameter from a plurality of customer edge routers and a plurality of provider edge routers associated with the virtual private network. The method correlates the performance data for identifying one or more performance exceptions based on a threshold for each of the at least one parameter, and performs a trending analysis using the one or more performance exceptions to predict a potential problem that will impact the virtual private network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Global enterprise networks tend to be large and expansive in scope, dispersed geographically across the globe and are designed to support a variety of services, such as voice, video, and data services. Each service has its own Quality of Service (QoS) and performance specifications, such as data delivery, latency and jitter requirements, which are generally guaranteed by Service Level Agreements (SLAs). Service providers who provide such networks for global enterprises have a challenging task to proactively manage these networks so that the SLAs will not be violated and negatively impact customer satisfaction.

To effectively manage these large networks, service providers have to actively monitor all the participating network elements from one Customer's Edge Router (CER) to another CER that forms an end to end connectivity supporting an enterprise network. However, performance data gathering and analysis is often performed manually.

To address this need, in one embodiment, the present invention provides automated data integration of multi-vendor service provider network, automatic detection of defects based on signature analysis and threshold exceptions, and automated visualization of exception reports on a global basis for staff to take corrective action to support VPN performance management on a global basis. For example, performance data of VPN network elements, such as customer edge router (CER) and provider edge router (PER), are collected by a plurality of data collectors. Collected performance parameters that exceed their corresponding thresholds are forwarded to the data analysis and reporting engine for correlation and integration to identify network problems on an end-to-end basis. Performance exceptions once identified will be used to generate trending analysis to identify future problem areas and to generate exception reports that will be sent regularly to the appropriate network work center personnel so that corrective actions can be taken.

The present invention provides time saving effective means to manage global enterprise networks via an automated proactive integrated view of CER and Provider Edge Router (PER) exceptions. It enhances the customer's experience and mitigates potential payouts of unfulfilled SLAs. In one embodiment, the present invention identifies opportunities for network resources optimization, e.g., rearranging the use of routers, or replacing or augmenting one type router with another, to satisfy ever changing communications needs of an enterprise network. In one embodiment, the present invention also provides sales personnel automatic alerts of "network hot spots" for potential sales opportunities.

The present invention solves the problem of labor intensive gathering and analysis of VPN related performance data in VPNs offered by service providers. In one embodiment, the present invention provides a method that is capable of automatically predicting network hot spots, network performance degradation, as well as automatically identifying potential service level agreement violations.

Figure 1:
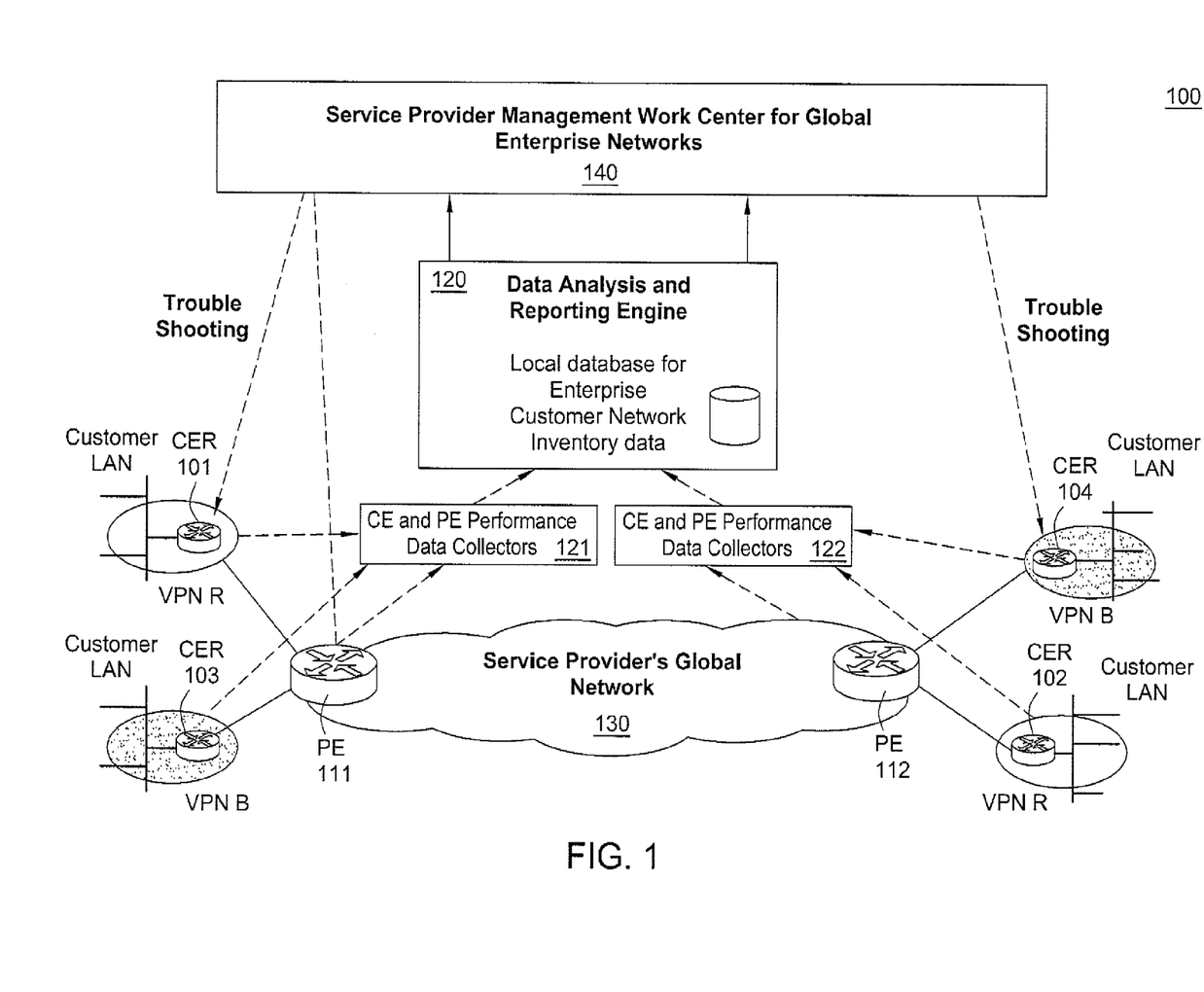
FIG. 1 illustrates a global network performance management functional architecture having an illustrative network, e.g., a VPN network related to the present invention.

To better understand the present invention, FIG. 1 illustrates a global network performance management functional architecture 100 having an illustrative network, e.g., a VPN network related to the present invention. In one embodiment, the network performance management functional architecture 100 comprises a service provider's global network 130 with provider edge routers (PER), PER111 and PER112, located at its edge. Each PER is connected to one or more customer edge routers (CERs) to support e.g., a VPN service connectivity. For instance, PER111 provides connectivity to CER101 and CER 103, and PER112 provides connectivity to CER102 and CER 104. Note that CER101 and CER102 form a VPN (e.g., VPN R), using network 130, and CER103 and CER104 form a VPN (e.g., VPN B), using network 130.

Customers' end to end services can be designed and implemented by configuring the network elements to provide a particular treatment of the traffic flow, e.g., based on the class of traffic, the policies specified the customer, the scheduling requirements and the like. In one embodiment, the performance data from each CER and PER will be collected by a set of data collectors, e.g., data collector121 and data collector 122, located globally such that an entire customer's global enterprise network is covered. For example, the collectors may periodically poll each of the CERs and PERs of the global enterprise network to collect performance parameters such as CPU usage (broadly referred to as processor usage), memory, link utilization, packet discards, and so on. Performance parameters that exceed their associated thresholds will be sent to a data analysis and reporting engine 120 for further processing.

In one embodiment, the data received from the data collectors is then analyzed and automatically integrated by one or more algorithms or methods incorporated in the data analysis and reporting engine 120 (e.g., implemented on an application server) to identify exceptions based on a set of pre-configurable thresholds for each performance parameter. For example, the algorithms may provide the capability to correlate and integrate the performance exceptions from the CERs to those of the associated PERs and the impacted customers. In one embodiment, the algorithms may also include the pairs of CERs that a service provider has agreed to support SLAs.

Furthermore, in one embodiment, the algorithms will include trending analysis for the performance exception data and will proactively predict future problem areas. For example, if the traffic exceeds predefined threshold values, the system will automatically create an exception report for the end to end customer connectivity.

In one embodiment, the exception report will be automatically presented to the Service Provider's Global Enterprise Customer Network Management Operations Center, e.g., work center 140. Work center personnel will then be able to immediately take appropriate corrective actions.

It should be noted that the global network performance management functional architecture 100 as illustrated in FIG. 1 is only illustrative of one possible implementation. As such, the present invention is not limited by the number of CERs, PERS, and/or data collectors as shown in FIG. 1.

Figure 2:
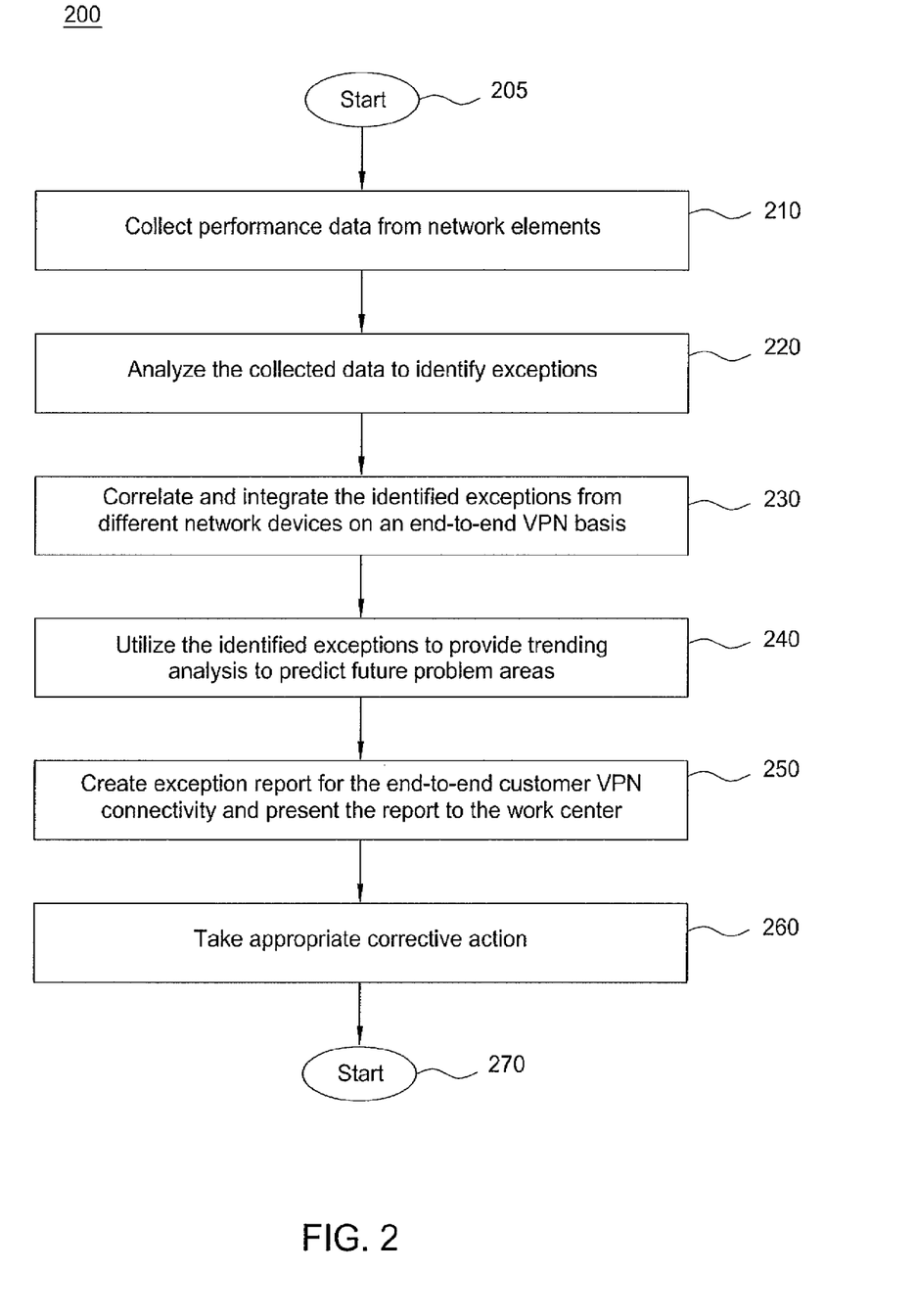
FIG. 2 illustrates a flowchart of a method for providing end to end performance management in a packet network, e.g., a VPN network, of the present invention.

FIG. 2 illustrates a flowchart of a method 200 for providing end to end performance management in a packet network of the present invention. For example, one or more steps of method 200 can be implemented by the data analysis and reporting engine 120. Method 200 starts in step 205 and proceeds to step 210.

In step 210, the method collects performance data from network elements supporting VPN connectivity. For example, the method may periodically poll each CER and PER of the global enterprise network to collect one or more performance parameters such as, but not limited to, CPU usage, memory utilization, link utilization, the number of dropped calls, and/or the number of discarded packets and so on. For example, the performance data is collected by a plurality of data collectors. In one embodiment, only collected data that is associated with performance parameters having exceeded their corresponding threshold values will be forwarded to the data analysis and reporting engine for further analysis.

In step 220, the method analyzes the collected performance data to identify exceptions based on a set of pre-configurable thresholds for each performance parameter. In one embodiment, the analysis and integration is performed by the data analysis and reporting engine.

In step 230, the method correlates and integrates the identified performance exceptions from the CERs to those of the associated PERs as well as the impacted customers. The pairs of CERs that a service provider has agreed to support SLAs affected by the exceptions will also be identified. In one embodiment, the correlation and integration is performed by the data analysis and reporting engine.

One aspect in the visualization of the enterprise VPN performance exception is to establish a visual consolidated dashboard that is capable of correlating each CER having a performance exception with its counterpart PER that also has a performance exception. For each such correlated CER-PER pair, it is desirable to identify the associated subinterfaces at the CER and at the PER by accurate means, such as IP subnetwork addresses. Typically, the topological parameters that facilitate such correlation include, but are not limited to, CER name, WAN interface name, CER interface subnetwork mask, CER interface IP address, and the corresponding values (e.g., name or address) for the PER upon which a given CER homes-in (or to which a CER is connected to). Correlation methodologies may also include invoking the inherent database relationships of layer 1 and layer 2 topological connectivity for various technologies (e.g., Frame Relay, Asynchronous Transfer Mode, Point-to-point Protocol, Multilink Point-to-to Protocol, Ethernet and Digital Subscriber Loop). The data analysis and reporting engine also provides a correlation between the CERs and the customers associated with them.

In one embodiment of the present invention, a visual consolidated dashboard identifies each PER that meets any of the following illustrative criteria:

PERs with a peak hour core (in the direction toward the core network) packet loss over 2%;
PERs with a peak hour CPU utilization over 90%;
PERs with a 5-minute peak CPU utilization over 70% for each of the past 30 business days.

In yet another embodiment of the present invention, a visual consolidated dashboard may identify PERs that are projected to exhaust CPU utilization within 90 days. It should be noted that the various threshold values as disclosed in the present invention can be adjusted to meet various requirements of a particular deployment. As such, the threshold values as disclosed in the present invention should not be interpreted as a limitation of the scope of the present invention.

Figure 3:
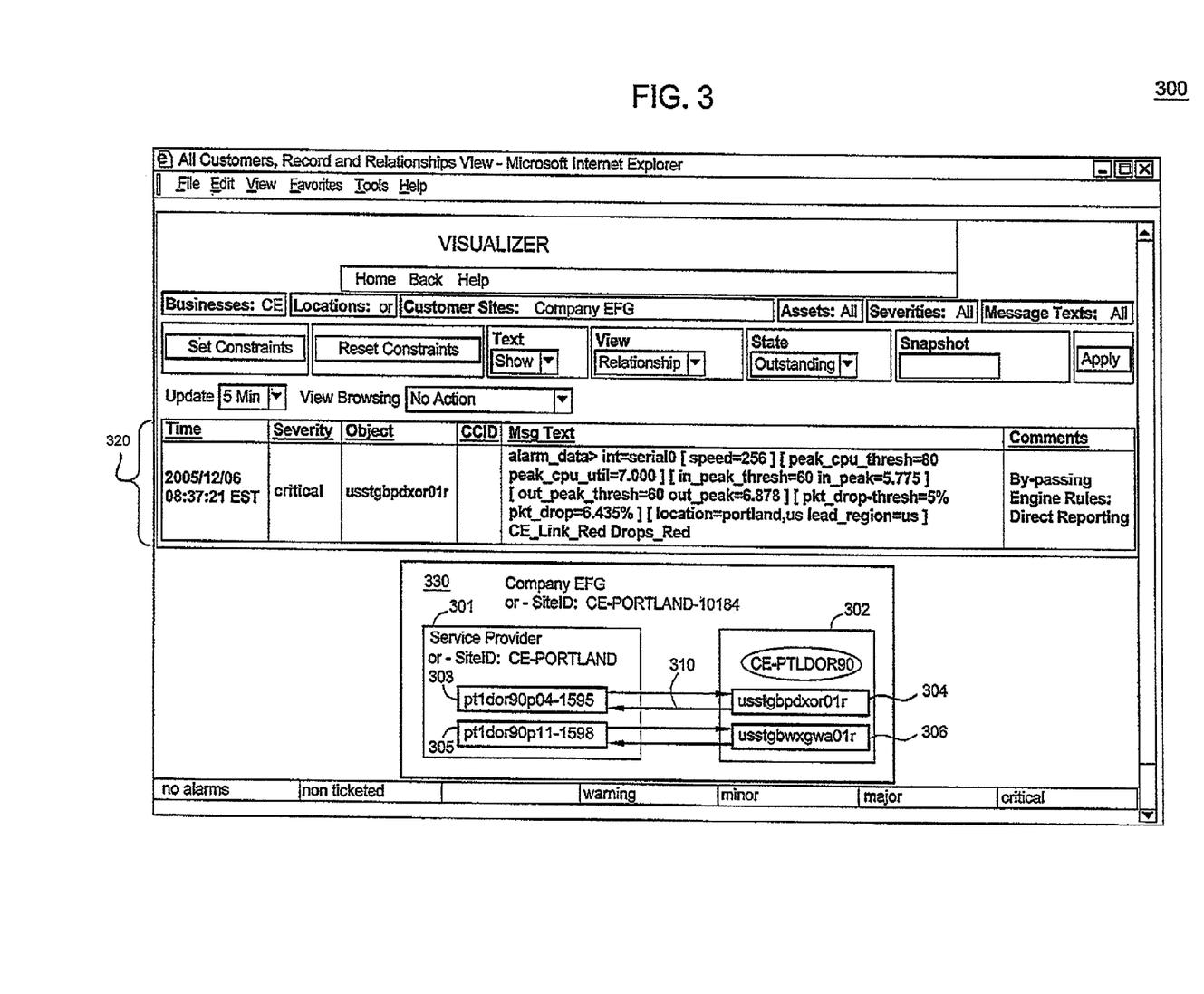
FIG. 3 illustrates an exemplary visual display of customer edge router (CER) percentage of packet drop exception related to the present invention.
Figure 4:
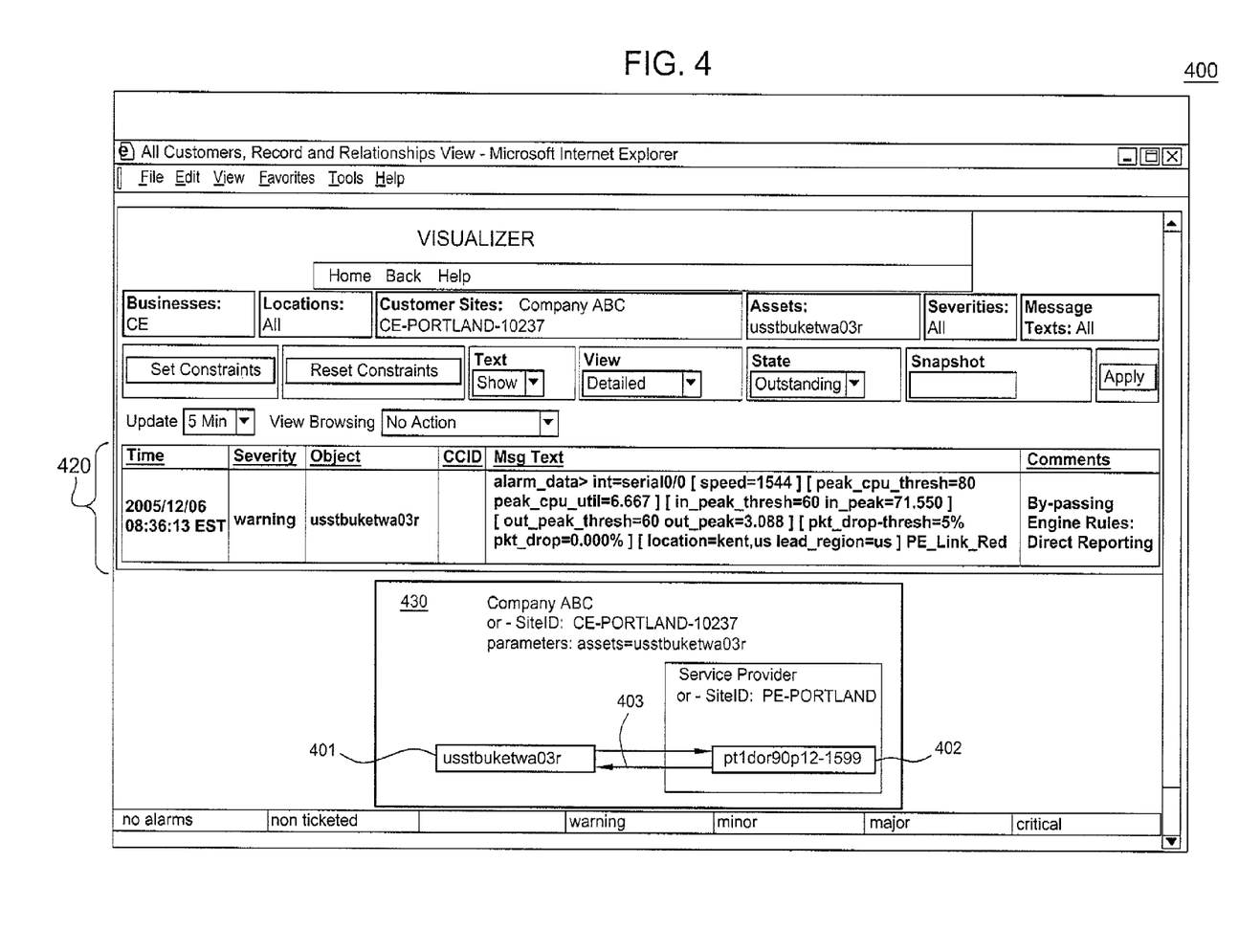
FIG. 4 illustrates an exemplary visual display of customer edge router (CER) access link utilization exception related to the present invention.
Figure 5:
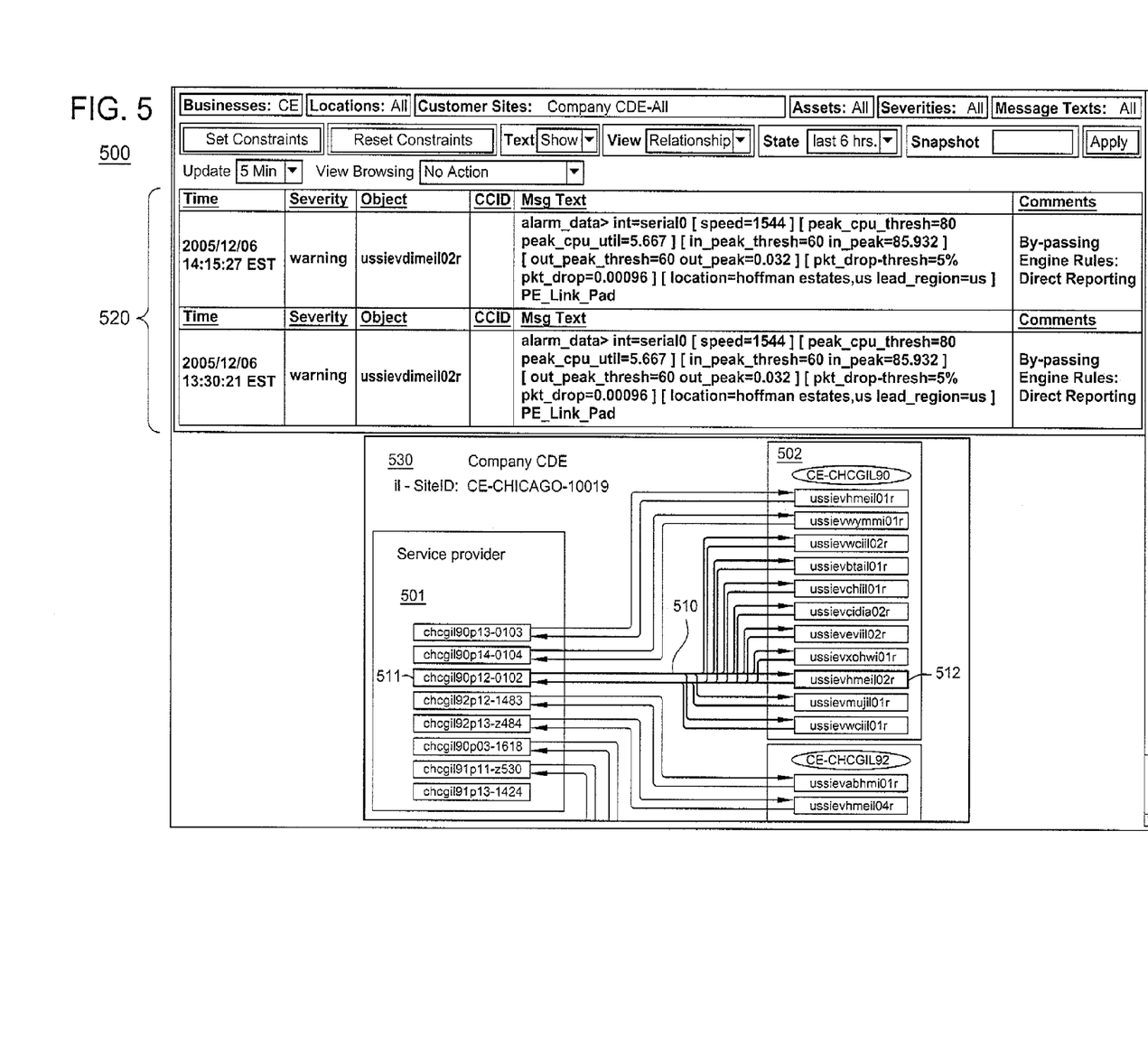
FIG. 5 illustrates another exemplary visual display of customer edge router (CER) access link utilization exception related to the present invention.

FIG. 3 to FIG. 5 provide a number of illustrative visual consolidated dashboard graphical user interface screens related to the present invention. For example, each screen may show an error or alarm that may impact one or more CERs that form an end to end connectivity. It should be noted that each screen is only illustrative and the type of displayed information can be tailored to the requirements of a particular implementation. One common aspect of each of the screens is that although each screen provides various text information relating to a particular alarm (e.g., time of a detected or reported alarm, a severity level of the alarm, an object of the alarm, a text message and/or comments associated with the alarm, and so on), each screen also provides a diagram (or broadly a graphical portion) that graphically illustrates the impacted end to end connectivity for a customer. Namely, the present invention provides an automated visualization for each correlated CER-PER pair that is impacted by an error, alarm or exception.

FIG. 3 illustrates an exemplary visual display 300 of a customer edge router (CER) percentage of packet drop exception related to the present invention. In FIG. 3, an alarm is illustrated in a text portion 320 of the screen. In a graphical portion 330 of the screen, the impacted connectivity of PER 301 and CER 302 associated with a customer, e.g., Company EFG, is shown. For example, PER 301 and CER 302 are connected by two sets of interface: one set of interface between PER interface 303 and CER interface 304 as well as another set of interface between PER interface 305 and CER interface 306. In this example, CER interface 304 and network link 310 in the direction from CER 304 to PER 303 are highlighted to indicate that the transmission in the direction from CER 304 to PER 303 is being affected due to a potential problem in both CER interface 304 and network link 310. Note that alarm highlights can be color coded to indicate a severity level of the alarms associated with the interface/link. For instance, a red color can be used to represent a critical alarm, an orange color to represent a major alarm, and a yellow color to represent a minor alarm, and so on.

FIG. 4 illustrates an exemplary visual display 400 of a customer edge router (CER) access link utilization exception related to the present invention. In FIG. 4, an alarm is illustrated in a text portion 420 of the screen. In a graphical portion 430 of the screen, the connectivity between a CER and a PER are represented by PER interface 401 and CER interface 402 associated with a customer, e.g., Company ABC is shown. In this illustrative example, CER interface 401 and network link 403 in the direction from PER interface 402 to CER interface 401 are highlighted to indicate that the transmission in the direction from the service provider network to the customer network is being affected due to a potential problem in network link 403. Note that alarm highlights can be color coded as discussed above to indicate the severity level of the alarms.

FIG. 5 illustrates another exemplary visual display 500 of customer edge router (CER) access link utilization exception related to the present invention. In FIG. 5, a plurality of alarms is illustrated in a text portion 520 of the screen. In a graphical portion 530 of the screen, the connectivity of PER 501 and CER 502 associated with a customer, e.g., Company CDE is shown. In particular, PER 501 and CER 502 are connected by a plurality of interfaces as shown. For example, the connectivity between PER interface 511 and CER interface 512 is one of many sets of interface connecting PER 501 and CER 502. CER interface 512 and network link 510 in the direction from PER interface 511 to CER interface 512 are highlighted to indicate that the transmission in the direction from PER interface 811 to CER interface 812 is being affected due to a potential problem in network link 510. Note that alarm highlights can be color coded as discussed above to indicate the severity level of the alarms associated.

In step 240, the method utilizes the identified exceptions to perform a trending analysis for the performance exception data and proactively predict future problem areas. For example, the trending analysis is performed by the data analysis and reporting engine to predict whether a potential problem may be imminent that may affect one or more customers.

In step 250, the method creates an exception report for the affected end to end customer VPN connectivity. In other words, the method may generate an exception report that indicates an impact to the end to end customer connectivity for the virtual private network. For example, the method presents the created report to the work center, where the exception report is created and presented by the data analysis and reporting engine. For example, data analysis and reporting engine may produce a number of CER exception reports that indicate potential problems that may impact VPNs of one or more customers. In one embodiment, the exception reports can be generated regularly and distributed via email communications. The following illustrative CER exception reports can be produced:

CE CPU exception report;
CE access link utilization IN (incoming to the CE);
CE access link utilization OUT (outgoing from the CE);
CE access link drops OUT (outgoing from the CE).

In step 260, the method takes the appropriate corrective actions to remedy the identified exceptions. For example, the necessary actions can be taken by the personnel of the work center. The method then ends in step 270.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 6:
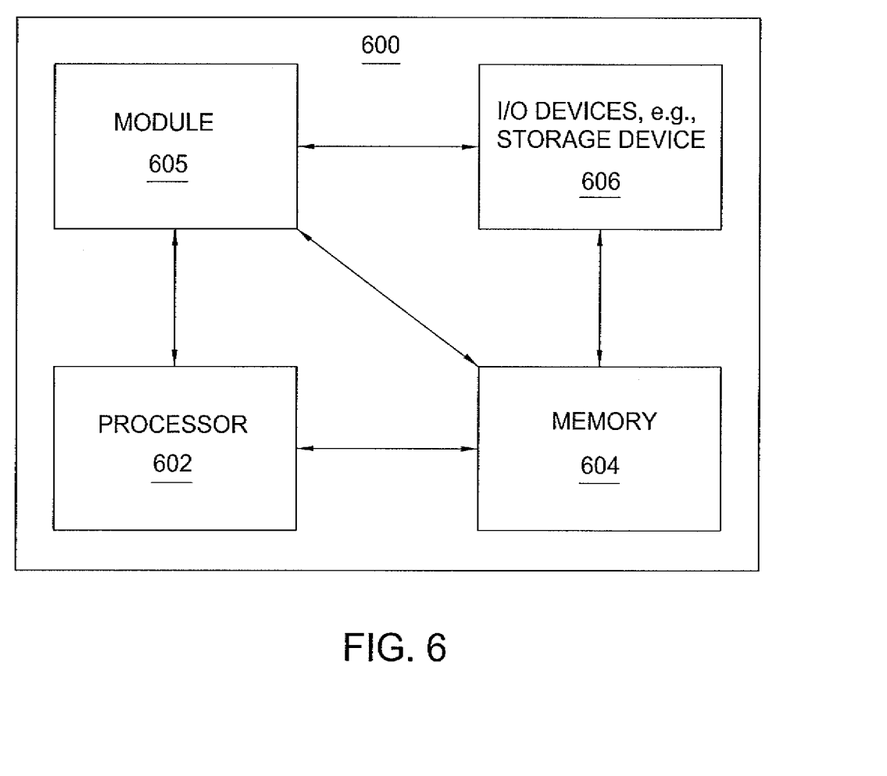
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing end to end VPN performance management, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for end to end VPN performance management can be loaded into memory 604 and executed by processor 602 to implement the functions as discussed above. As such, the present process 605 for providing end to end VPN performance management (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for predicting a potential problem that will impact a virtual private network, comprising:

collecting, by a processor, performance data for a parameter from a plurality of customer edge routers and a plurality of provider edge routers associated with the virtual private network;

correlating, by the processor, the performance data for identifying a performance exception based on a threshold for the parameter, wherein the correlating comprises:
  correlating the performance data to identify the performance exception affecting a customer edge router-provider edge router pair from the plurality of customer edge routers and the plurality of provider edge routers; and
  correlating the customer edge router-provider edge router pair for identifying an affected customer; and
performing, by the processor, a trending analysis using the performance exception to predict the potential problem that will impact the virtual private network.

2. The method of claim 1, further comprising:
generating an exception report that indicates an impact of an end to end customer connectivity for the virtual private network.

3. The method of claim 2, wherein the exception report comprises a customer edge outgoing access link utilization report.

4. The method of claim 2, wherein the exception report is distributed via an email to a network work center.

5. The method of claim 1, wherein the collecting comprises:
  using a plurality of data collectors to poll periodically each of the plurality of customer edge routers and the plurality of provider edge routers to collect the performance data; and
  sending only a portion of the performance data for the parameter that has exceeded the threshold to a data analysis and reporting engine for processing.

6. The method of claim 1, wherein the correlating further comprises:
  identifying a sub-interface at the customer edge router-provider edge router pair to obtain a topological parameter comprising a customer edge router interface subnetwork mask.

7. The method of claim 1, wherein the correlating comprises:
  establishing a visual dashboard to illustrate a correlation between a customer edge router and a counterpart provider edge router of the customer edge router-provider edge router pair.

8. A non-transitory computer-readable medium storing a plurality of instructions which, when executed by a processor, cause the processor to perform operations for predicting a potential problem that will impact a virtual private network, the operation comprising:
  collecting performance data for a parameter from a plurality of customer edge routers and a plurality of provider edge routers associated with the virtual private network;
  correlating the performance data for identifying a performance exception based on a threshold for the parameter, wherein the correlating comprises:
    correlating the performance data to identify the performance exception affecting a customer edge router-provider edge router pair from the plurality of customer edge routers and the plurality of provider edge routers; and
    correlating the customer edge router-provider edge router pair for identifying an affected customer; and
  performing a trending analysis using the performance exception to predict the potential problem that will impact the virtual private network.

9. The non-transitory computer-readable medium of claim 8, further comprising:
generating an exception report that indicates an impact of an end to end customer connectivity for the virtual private network.

10. The non-transitory computer-readable medium of claim 9, wherein the exception report comprises a customer edge outgoing access link utilization report.

11. The non-transitory computer-readable medium of claim 9, wherein the exception report is distributed via an email to a network work center.

12. The non-transitory computer-readable medium of claim 8, wherein the collecting comprises:
  using a plurality of data collectors to poll periodically each of the plurality of customer edge routers and the plurality of provider edge routers to collect the performance data; and
  sending only a portion of the performance data for the parameter that has exceeded the threshold to a data analysis and reporting engine for processing.

13. The non-transitory computer-readable medium of claim 8, wherein the correlating further comprises:
  identifying a sub-interface at the customer edge router-provider edge router pair to obtain a topological parameter comprising a customer edge router interface subnetwork mask.

14. The non-transitory computer-readable medium of claim 8, wherein the correlating comprises:
  establishing a visual dashboard to illustrate a correlation between a customer edge router and a counterpart provider edge router of the customer edge router-provider edge router pair.

15. A system for predicting a potential problem that will impact a virtual private network, comprising:
  a processor; and
  a computer-readable medium storing a plurality of instructions which, when executed by the processor, cause the processor to perform operations, the operations comprising:
    collecting performance data for a parameter from a plurality of customer edge routers and a plurality of provider edge routers associated with the virtual private network;
    correlating the performance data for identifying a performance exception based on a threshold for the parameter, wherein the correlating comprises:
      correlating the performance data to identify the performance exception affecting a customer edge router-provider edge router pair from the plurality of customer edge routers and the plurality of provider edge routers; and
      correlating the customer edge router-provider edge router pair for identifying an affected customer; and
    performing a trending analysis using the performance exception to predict the potential problem that will impact the virtual private network.

16. The system of claim 15, further comprising:
generating an exception report that indicates an impact of an end to end customer connectivity for the virtual private network.

17. The system of claim 16, wherein the exception report comprises a customer edge outgoing access link utilization report.

18. The system of claim 16, wherein the exception report is distributed via an email to a network work center.

19. The system of claim 15, wherein the collecting comprises:
- using a plurality of data collectors to poll periodically each of the plurality of customer edge routers and the plurality of provider edge routers to collect the performance data; and
- sending only a portion of the performance data for the parameter that has exceeded the threshold to a data analysis and reporting engine for processing.

20. The system of claim 15, wherein the correlating further comprises:
- identifying a sub-interface at the customer edge router-provider edge router pair to obtain a topological parameter comprising a customer edge router interface subnetwork mask.

* * * * *